June 22, 1937. W. H. HOWE Re. 20,418

METHOD OF CONTROLLING RECTIFIERS AND CIRCUITS THEREFOR

Original Filed July 25, 1933 10 Sheets-Sheet 1

INVENTOR.
Wilfred H. Howe
BY Wright Brown Quinby & May
ATTORNEYS.

METHOD OF CONTROLLING RECTIFIERS AND CIRCUITS THEREFOR

Original Filed July 25, 1933 10 Sheets-Sheet 2

INVENTOR.
Wilfred H. Howe
BY Wright Brown Quinby & May
ATTORNEYS.

METHOD OF CONTROLLING RECTIFIERS AND CIRCUITS THEREFOR

Original Filed July 25, 1933 10 Sheets-Sheet 3

INVENTOR.
Wilfred H. Howe
BY Wright Brown Quinby & May
ATTORNEYS.

METHOD OF CONTROLLING RECTIFIERS AND CIRCUITS THEREFOR

Original Filed July 25, 1933 10 Sheets-Sheet 4

INVENTOR.
Wilfred H. Howe
BY Wright Brown Quinby & May
ATTORNEYS.

METHOD OF CONTROLLING RECTIFIERS AND CIRCUITS THEREFOR

Original Filed July 25, 1933 10 Sheets-Sheet 5

INVENTOR.
Wilfred H. Howe
BY Wright Brown Quinby & Clay
ATTORNEYS.

METHOD OF CONTROLLING RECTIFIERS AND CIRCUITS THEREFOR

Original Filed July 25, 1933 10 Sheets-Sheet 6

INVENTOR.
Wilfred H. Howe
BY Wright Brown Quinby & May
ATTORNEYS.

June 22, 1937. W. H. HOWE Re. 20,418

METHOD OF CONTROLLING RECTIFIERS AND CIRCUITS THEREFOR

Original Filed July 25, 1933 10 Sheets-Sheet 7

INVENTOR.
Wilfred H. Howe
BY Wright Brown Quinby & May
ATTORNEYS.

June 22, 1937. W. H. HOWE Re. 20,418

METHOD OF CONTROLLING RECTIFIERS AND CIRCUITS THEREFOR

Original Filed July 25, 1933 10 Sheets-Sheet 8

INVENTOR.
Wilfred H. Howe
BY
Wright Brown Quinby & May
ATTORNEYS.

METHOD OF CONTROLLING RECTIFIERS AND CIRCUITS THEREFOR

Original Filed July 25, 1933 10 Sheets-Sheet 9

INVENTOR.
Wilfred H. Howe
BY Wright Brown Quinby & May
ATTORNEYS.

METHOD OF CONTROLLING RECTIFIERS AND CIRCUITS THEREFOR
Original Filed July 25, 1933 10 Sheets-Sheet 10
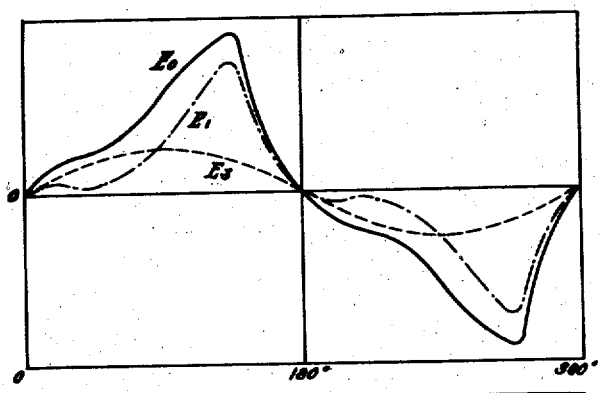
Fig. 25.
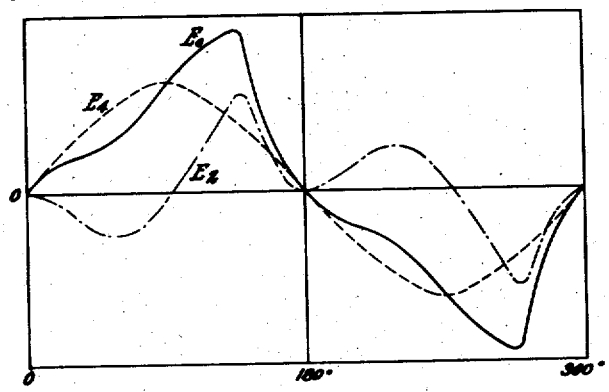
Fig. 26.
Fig. 28.
Fig. 27.
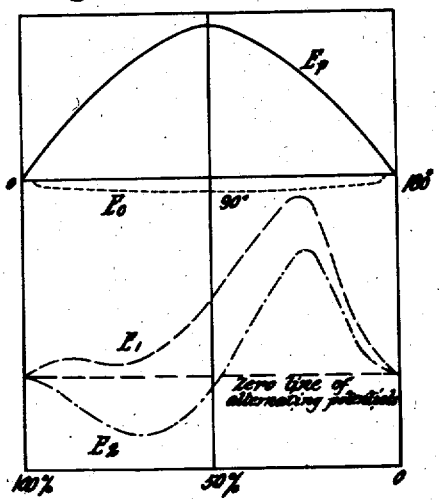
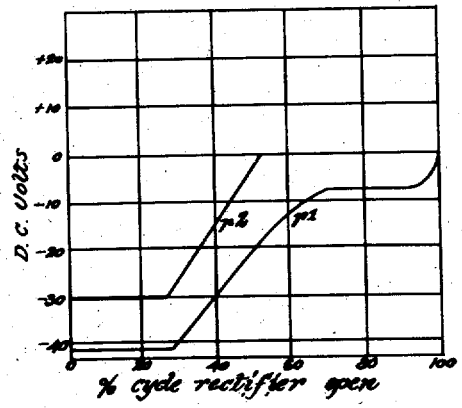
INVENTOR.
Wilfred H. Howe
BY
Wright Brown Quinby & May
ATTORNEYS.

Reissued June 22, 1937 Re. 20,418

UNITED STATES PATENT OFFICE 20,418

METHOD OF CONTROLLING RECTIFIERS AND CIRCUITS THEREFOR

Wilfred H. Howe, Winchester, Mass., assignor to Atlantic Precision Instrument Company, Malden, Mass., a corporation of Massachusetts Original No. 2,020,314, dated November 12, 1935, Serial No. 682,120, July 25, 1933. Application for reissue November 12, 1935, Serial No. 49,432

19 Claims. (Cl. 172—179)

This invention relates to the control of rectifiers of the arc type with separate control of the ignition time among which are those of the gas filled thermionic or hot cathode type, such, for example, as those containing mercury vapor, or inert gases such as neon or the like. It is characteristic of these rectifiers that they require a definite negative or positive ignition control voltage to prevent controlled current flow and that if this voltage is made sufficiently positive so that flow of controlled current is once started this flow continues even though the control voltage is thereafter made negative to or beyond a point which would have prevented the flow of controlled current if it were not already flowing. Where an alternating potential causes the flow of controlled current, however, the reversal of potential causes the controlled current to cease so that if the controlling voltage is then sufficiently negative, controlled current will not again flow on the positive half of the cycle. This invention will be further described with particular reference to rectifiers of the hot cathode type, but it should be understood that unless specifically so stated the invention includes all rectifiers utilizing a separate ignition time control voltage.

Heretofore two general methods of control have been utilized for rectifiers of this character. In accordance with one method direct potential only is impressed on the grid. If this direct current is more negative than a given value dependent on the temperature of the tube and the potential of the output circuit, no current flows in the output circuit, while if the grid potential is more positive than this value, the tube is "wide open". With this method of control the tube acts as a relay, being either closed or fully open. This method cannot control the amount of current flow if conditions are correct for any flow at all.

The other method consists in impressing on the grid an alternating potential of suitable magnitude in adjustable phase relation to the alternating potential applied to the output circuit. By adjusting this phase relation the time of start of the plate current in the positive half cycle of the plate voltage may be determined so that the average output current flow is adjustable between zero and a maximum. For zero current the tube fails to open, and for maximum it is open during the entire positive half cycle of the plate voltage.

The present invention relates to a different method of control having the advantage of control of the average output current flow possessed by the phase shift method but without requiring variable phase control. In accordance with the method of this invention, the control is provided through a variable direct current potential which is often much easier to obtain than a variable phase alternating control potential. For example, any type of vacuum tube circuit may be used, the output from such a circuit being in effect a variable direct current, and this may be intensified by one or more stages of amplification so as to be adequate both in potential and power for such control. There are many other types of circuits also where it is an easy matter to obtain a source of variable direct current potential for controlling the tube.

With this type of control it is possible by choosing the proper phase relation between a necessary alternating current grid potential component and the alternating current input to the tube to determine the character of response in tube output to a change in potential of the controlling direct current grid potential.

In order that the application of such variable direct current for control purposes and the effects thereon of various phase relations between the alternating current grid component and the alternating current input may be better understood, reference may be had to the accompanying drawings in which Figures 1 to 6 are diagrams illustrating average values of certain characteristics of a mercury vapor filled tube, such a tube requiring a negative grid potential to prevent plate-cathode current flow.

Figures 25 and 26 are curves showing two different values of alternating potential added to the harmonic potential of Figure 24.

Figure 27 is a curve illustrating the effect of applying the voltage shown in Figures 25 and 26 on the rectifier grid.

Figure 28 is a curve showing the plate current resulting from the grid voltage cycles of Figure 27.

This application is a continuation in part of my application Serial No. 562,694, filed September 14, 1931, for Method of controlling gas filled thermionic rectifiers and fundamental circuit therefor.

Figure 1:
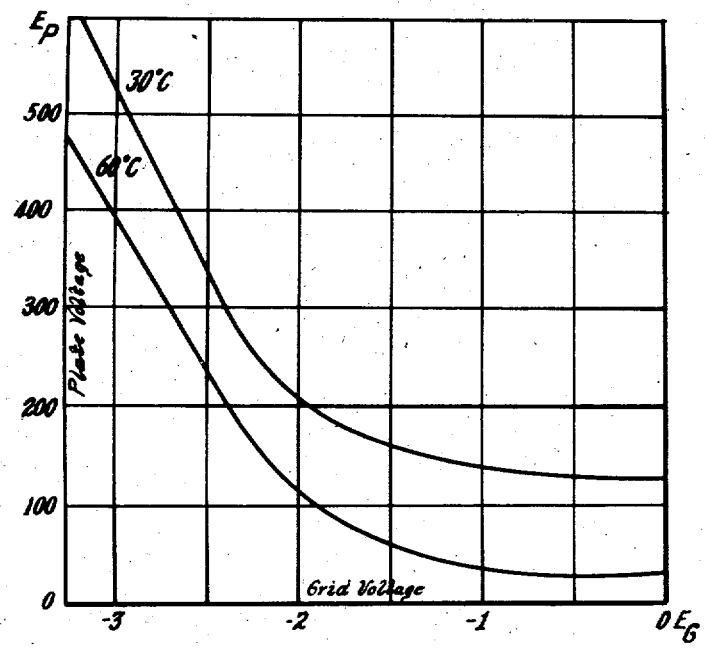

In Figure 1 are shown two average characteristics of a tube of this description with the minimum temperatures within the tube of 30° and 60° C. and show the values of grid cathode potential which is just sufficient to prevent ionization within the tube at the anode cathode potentials shown, the ordinates for these curves being plate voltage $E_p$, and the abscissas representing grid voltage. It is characteristic of gas filled tubes that as long as the grid potential $E_g$ is more negative than the value on the curve, anode-cathode current will be very small, the tube then being closed, while as soon as the grid cathode potential becomes more positive than this value, a large anode-cathode current flows limited primarily by the external impedance of the anode-cathode circuit, the tube then being wide open, and this large value of current will continue to flow regardless of the grid potential unless and until the potential of the anode-cathode circuit is interrupted or reversed.

Figure 2:
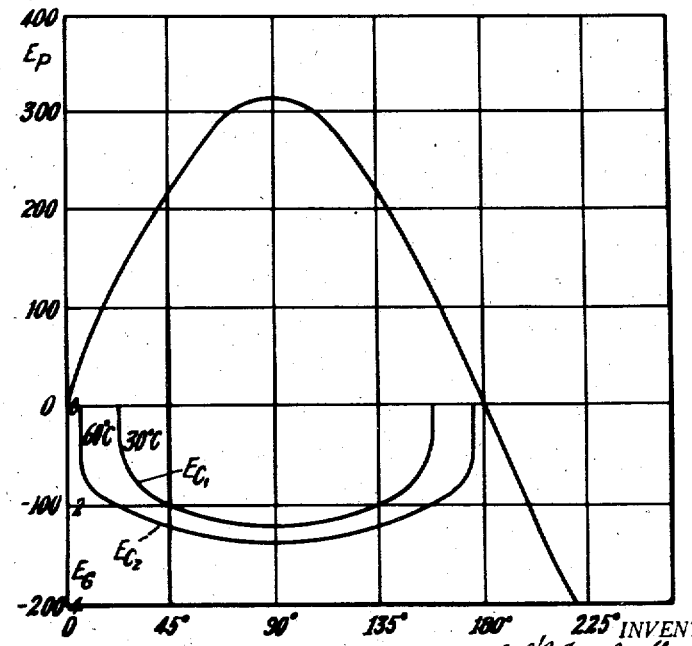

Figure 2 is derived directly from Figure 1. $E_p$ represents the instantaneous plate voltage for a 220 volt root mean square sinusoidal potential representing the potential applied to the anode-cathode circuit. The curves $E_{c1}$ and $E_{c2}$ represent the corresponding grid cathode potential for minimum tube temperatures of 30° and 60° C., respectively, just sufficient to prevent ionization of the tube, that is, just sufficient to prevent current flow in the anode-cathode circuit. At any instant if the actual grid cathode potential has remained and is more negative than $E_c$ no current will flow in the anode-cathode circuit, and current will commence to flow in the anode-cathode circuit at that instant when the grid-cathode potential becomes more positive than $E_c$, such current continuing through the remainder of the positive half of the cycle of the anode-cathode potential. This curve of Figure 2 is plotted against degrees, the zero point for degrees being taken as the zero potential of the anode-cathode circuit.

Figure 3:
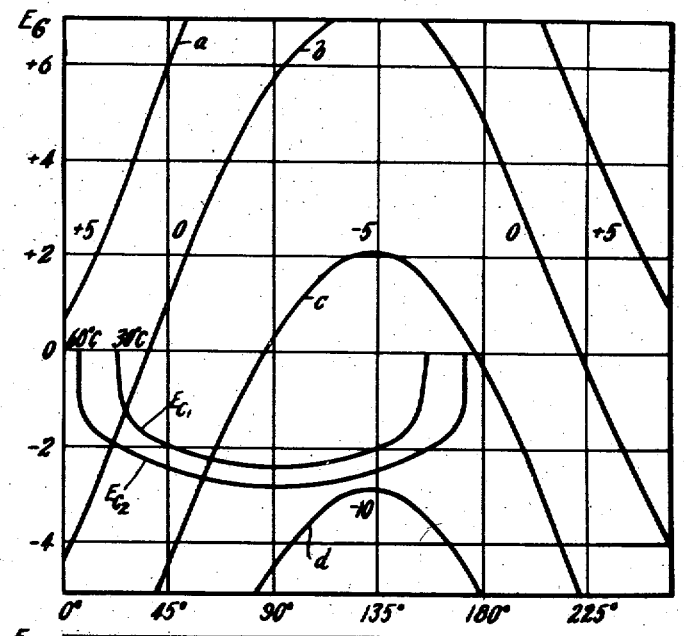

Figure 3 shows the curves $E_{c1}$ and $E_{c2}$, potential on grid cathode for cut-off, taken from Figure 2. Against these curves are plotted four other curves *a*, *b*, *c* and *d*, each consisting of the sum of a sinusoidal alternating potential of 5 volts root mean square in phase lagging the anode-cathode potential by 45° and a constant direct current potential of plus 5, zero, minus 5 and minus 10 volts, respectively. From an inspection of these curves it is apparent that with the plus 5 volts direct current (curve *a*), the grid cathode potential is always positive with respect to the cut-off potential $E_c$ and that the tube will therefore conduct during the entire positive half of the cycle of anode-cathode potential. Under these conditions the tube will be wide open throughout the full positive half cycle. With zero volts direct current, (curve *b*), potential of the grid will be negative with respect to the cut-off potential for about the first 30° of the cycle and will then become positive with respect to this cut-off potential. In other words, the tube will be open wide about 30° after the positive anode-cathode potential is applied so that current will commence to flow at that time and will continue throughout the remainder of the positive half of the cycle. Thus the average current flow will be less than if the tube were wide open during the whole positive half cycle, as when a direct current potential of plus 5 volts is superposed on the alternating grid potential as shown by the curve *a*. If the direct current component of grid-cathode potential is reduced to minus 5 volts as shown by curve *c*, the intersection of this curve with the curve $E_c$ indicates that the current in the anode-cathode circuit will commence about 60° after the potential is applied.

With a direct current potential of minus 10 volts, shown in the curve *d*, the potential of the grid is always more negative than the cut-off potential and as a result substantially no current will flow through the anode-cathode circuit as the tube will remain closed.

Figure 4:
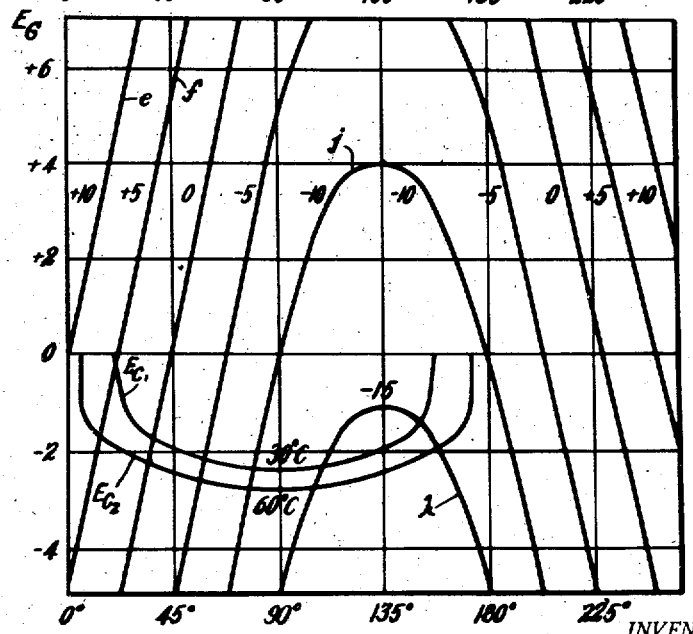

Figure 4 is similar to Figure 3, except that the alternating potential component of the grid-cathode potential is 10 volts root mean square for all curves instead of 5 volts as in Figure 3. Thus with plus 10 volts direct current component as shown by the curve *e*, the tube will open at the beginning of the positive half cycle. With plus 5 volts direct current it will open about 15° after the commencement of the positive half cycle (curve *f*). With minus 10 volts the tube will open approximately 70° after the start of the positive half cycle (curve *j*) though with the lower alternating current plate voltage of Figure 3 the tube will not open at all with this negative direct current potential. Even the use of minus 15 volts direct current voltage component will fail to hold the tube closed throughout the cycle with this higher value of alternating voltage as is shown in curve *k*.

Figure 5:
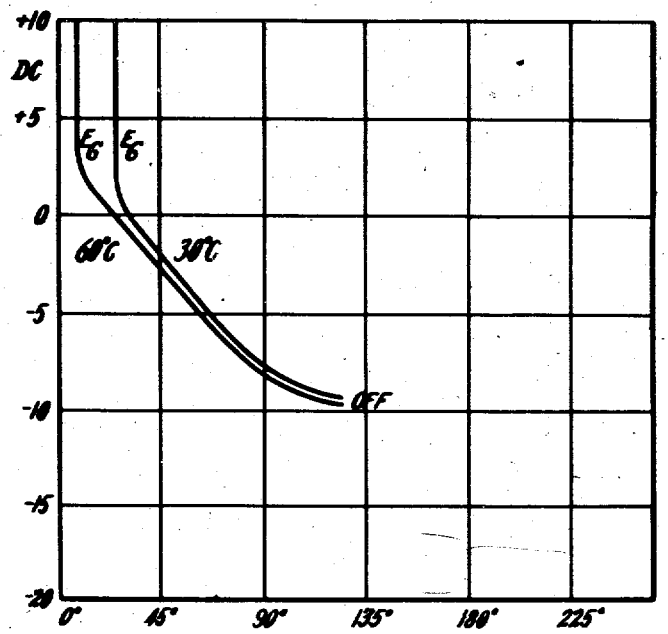

Figure 5 shows the relative phase position of the anode-cathode potential at the start of anode-cathode current flow for all values between plus 10 and minus 20 volts of direct current potential applied to the grid together with the same 5 volts root mean square sinusoidal alternating potential as in Figure 3, this curve in fact being in summary of the points of intersection of a complete family of curves such as the curves *a*, *b*, *c*, and *d* of Figure 3 with the curves $E_{c1}$ and $E_{c2}$. This figure shows how, by varying the direct current component of potential applied to the grid, the time of commencement and thus the average current and likewise the power of the anode-cathode circuit is caused to vary.

Figure 6:
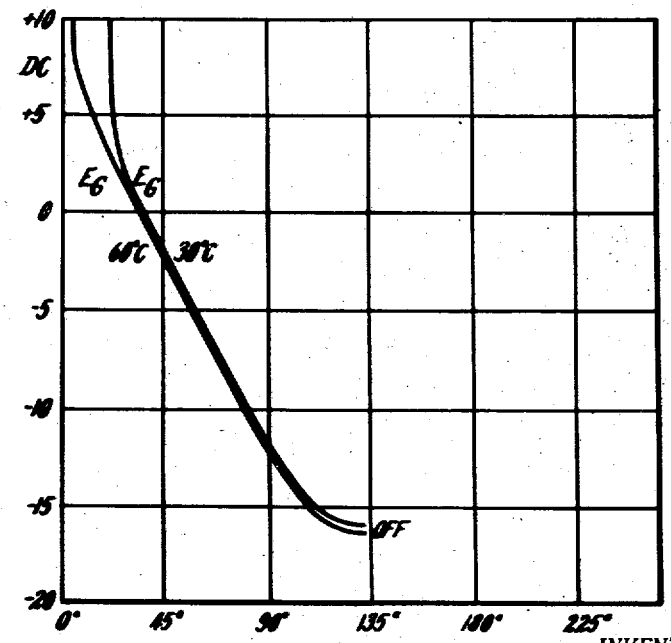

Figure 6 is similar to Figure 5, except that it is made from the values shown in Figure 4. It will be noted that the curves of Figures 5 and 6 are similar in shape, but that in Figure 6 a considerably larger change of direct current potential is necessary for the same change of starting time of the anode-cathode current. It will be apparent, therefore, that by adjusting the alternating potential, the relation of change of direct current potential to the controlled change of anode-cathode power can be set within wide limits.

The phase lag of the alternating current potential component of the grid cathode voltage has been shown as 45° for all the curves. An inspection of Figures 3 and 4, however, shows that an increase of this angle of lag increases the angle at which the cut-off voltage is reached and also increases somewhat the direct current component necessary to make the tube start to conduct in the anode-cathode circuit as soon as the anode-cathode potential is applied. The amount of this phase lag, as will later be more fully described, determines the character of the output control. Where it is desired that the main control of the tube be by direct current grid voltage variations, in order that smooth, full range control may be had, the alternating current grid phase variation possible is strictly limited, as will later be more fully explained.

Figure 7:
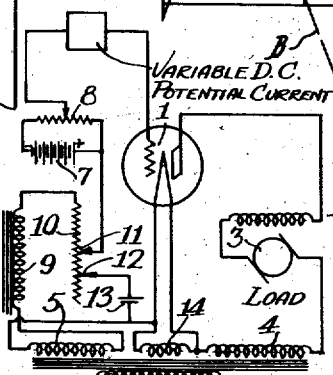
Figure 7 is a diagram of the fundamental control circuit.

Figure 7 is a diagram of the fundamental circuit making use of this type of control. The gas filled tube indicated at 1 is energized by the transformer 2 supplying power to an output circuit which is illustrated as the motor at 3, though it should be understood that any desired load might be substituted. The transformer 2 is supplied with power of any desired frequency, as, for example, 110 volts at 60 cycles per second and has three secondaries. One secondary, 14, energizes the cathode of the tube. A second, 4, supplies power to the output circuit which leads to the plate of the tube, while a third, 5, is utilized in the operation of the controlling circuit. The controlling circuit consists of three essential parts. The first comprises a source of varying direct current potential illustrated at 6 from which it is desired to control the output circuit. It will be noted that this source 6, as shown, is entirely independent of any circuit controlled by the tube, or of any other circuit controlling the tube, so that the effective value of its potential is not modified in any way by the tube or its immediate essential circuits. As hereinbefore pointed out, this may be a vacuum tube system operated by any suitable source, such, for example, as a light sensitive tube or a measuring system such as is shown in the Allen Patents No. 1,708,074 granted April 9, 1929, and No. 1,781,153 granted November 11, 1930, or a direct current magneto for speed control, or any other source from which it is desired to exercise a power control. The second part comprises a source of direct current potential of determined value such as a battery 7 and a potentiometer 8. The third comprises a source of alternating potential of the same frequency as that applied to the output circuit and so arranged that any desired fixed value of potential in any desired phase relation to the output circuit potential may be obtained. This third part will be more fully described. These three parts are connected in series between the cathode of the tube and the grid. They may be in any desired order. As shown the variable direct current controlling potential is next to the grid and the direct current potential of fixed value is adjacent thereto, but any other order would be as satisfactory.

The third part, which comprises the source of alternating potential of controllable magnitude and phase, is supplied by the network consisting of the transformer secondary 5, a fixed inductance 9, a resistor 10 with two taps 11 and 12 and a condenser 13. The transformer secondary 5 supplies a fixed potential exactly in phase with the potential of the output or plate circuit. This potential causes a current flow through the inductance 9, the resistor 10 and the condenser 13. If the condenser and inductance are of equal impedance they exactly balance out and this current is exactly in phase with the voltage of the transformer secondary 5. The current flowing through the condenser 13 produces an impedance drop 90° lagging the current and hence 90° lagging the potential of the input circuit. Since the inductance and the capacity exactly balance out of the complete circuit the current flow is determined by the resistance 10 and can be set up at any desired value by adjusting the tap 12. By varying this resistance and thus the current, a potential across the condenser of any desired value can be obtained up to the limit of the transformer secondary 5. By adjusting the relative positions of the taps 11 and 12 any desired alternating potential less than this in phase with the output circuit potential can be obtained. The total alternating component potential of the control circuit is the sum of the potential across the condenser 13 and that between the taps 11 and 12. These two potentials, however, are 90° apart in phase and each may be set at any desired magnitude so that their vector sum may be adjusted to any desired magnitude within the limits imposed by the potential of the transformer secondary 5 and at any desired phase between in phase and 90° lagging the output potential.

In practice the construction of this phase magnitude control circuit may be varied. For example, for motor control circuits where the minimum current in the output circuit should be set fairly large and hence the maximum phase difference between the output circuit and the alternating component of the controlling circuit is fairly small the condenser 13 may be dispensed with. In practice also a certain value or range of values of alternating potential for the control circuit may be necessary or desirable and any circuit providing this potential in the desired phase relation to the output circuit may be used.

By properly adjusting the magnitude and phase relation of this alternating component of grid voltage, and the negative direct current voltage, changes of the controlling direct current voltage of predetermined amount may be caused to produce the desired variations in current flow in the output circuit of the tube so as to produce the desired response in output current for any variation in the controlling circuit. While the controlling direct current voltage has been shown as entirely separate from the negative constant direct current voltage, of course, in many instances both might be represented by a single variable controlling voltage maintained negative with respect to the grid. Likewise the controlling direct current voltage may be the summation of two or more variable direct current voltages each of which has its effect on the controlled circuit.

Figure 8:
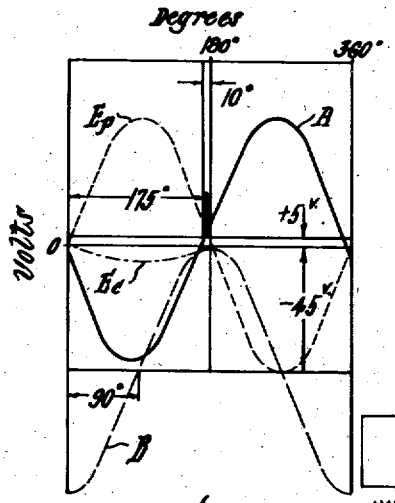
Figures 8, 9 and 10 are diagrams illustrating the limits of smooth full range control by change of phase relation between the alternating current grid component and the input voltage.
Figure 9:
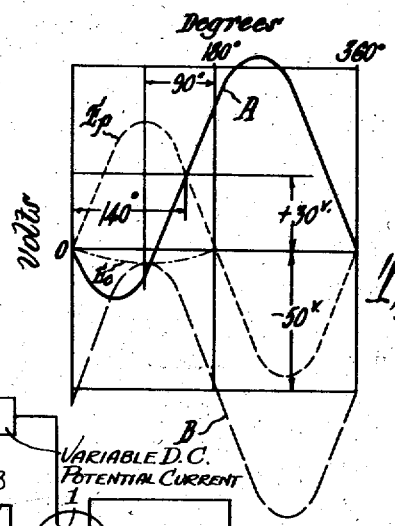
Figure 10:
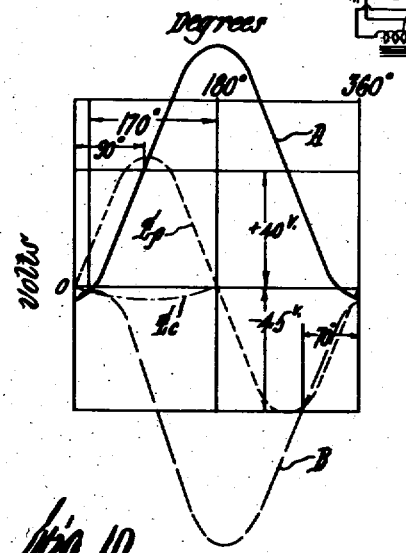

The effects of variations of the phase relation between alternating current component of grid voltage and input power will now be further considered, as quite regardless of the direct current grid potential and of magnitude of alternating current grid potential, the phase of the alternating grid voltage relative to that of the input must lie within certain limits for control of plate current flow during any specific proportion of the cycle. These phase limits are illustrated in Figures 8, 9 and 10. In these figures, the plate to filament potential $E_p$ is shown in dash lines as a sine wave. The abscissas represent the complete cycle of input voltage and the ordinates represent numerical current values. At $E_c$ is shown a curve of critical grid voltage, that is, the voltage on the grid which is just sufficient to cause the tube to open and pass current. So long as the grid remains more negative with respect to the filament than the value indicated on the curve $E_c$, this flow of current in the plate circuit is prevented, but at the first instant that the grid becomes less negative with respect to the filament than the value $E_c$, the flow of plate current will commence and once started will continue until interrupted by the alternation of the plate voltage at the 180° line.

In Figure 8 it is assumed that conditions of the grid circuit are correct to permit plate current flow during a small part, about 10°, of each cycle. The grid voltage thus reaches the critical value $E_c$ only ten degrees to the left of the 180° line of this figure, or, in other words, the grid permits the plate current to start flowing 10° before the reversal of plate potential interrupts this flow. Two combinations of alternating and direct potentials are illustrated which accomplish this control in the curves marked A and B. In both curves and throughout Figures 8, 9, and 10 a constant magnitude alternating grid potential with a peak amplitude of forty-five volts has been used. In Figure 8, curve A, this potential has been set up lagging the plate to filament potential by 175° and a direct current component of plus 5 volts used with it. It will be noted that if either the angle of lag, or the direct current component be materially increased, then this grid potential curve will intersect the critical grid voltage line $E_c$ not only at the 10° line near to the 180° line, causing the plate current flow during 10° of the cycle, but will also intersect the critical voltage curve $E_c$ at its left hand end causing the plate current to start at the beginning of the cycle. That is, if the alternating current potential lags by somewhat more than 175°, the tube will open wide or not at all. Furthermore, with the alternating potential lagging by 175° the tube cannot be made to open gradually by direct current control through much more than 10° of plate current flow before the tube will open wide. In curve B, on the other hand, with the alternating potential lagging by 90° combined with a direct current potential of minus 45 volts, if the direct current potential is made less than forty-five volts, that is, becomes more positive, so that the curve B as a whole is elevated from the position shown, then gradual increase of plate current flow will occur. Thus the plate current will start earlier, but this earlier start will be proportional to the direct current grid potential. If, however, this alternating current potential is used lagging by less than 90°, then its point of intersection with the grid voltage curve $E_c$ will occur at an earlier point in the cycle so that a decrease of direct current will cause, not a gradual decrease of time of plate current flow to a complete closing, but a sudden complete interruption of all flow of current in the plate circuit when the grid plate voltage is lowered out of contact with the curve $E_c$ which will be at a point less than 10° of plate current flow, that is, less than 10° from the 180° point where the plate voltage reverses.

To summarize the foregoing, to produce a plate current flow during ten degrees of the plate current cycle, it is necessary that the controlling grid alternating potential in the grid circuit shall lag the potential in the plate circuit by an angle not less than 90° nor more than 175°. If the angle of lag is less than 90°, variation of the direct current component in the grid circuit will cause the tube to either shut off plate current flow entirely, or to pass plate current through an angle of more than ten degrees. If the angle of lag is more than 175°, then variation of direct current component in the grid circuit will cause the tube to either permit current flow for less than ten degrees, or else to permit current flow through the entire positive half of the cycle.

Figures 9 and 10 illustrate the same effects for plate current flow during 90° and 170°, respectively. Figure 9 illustrates particularly well that at the condition of maximum grid voltage lag (curve A) direct current potential control may be exercised for all values of plate current time less than 90°, while at the condition of minimum grid voltage lag, (curve B) direct current potential control may be exercised for all values of plate current time more than 90°. In Figure 10 where the plate current flow is during 170° the minimum grid voltage lag has become less than zero, that is, has become lead instead of lag, but the effects are the same.

It may be noted from these figures that though only a single value of magnitude of alternating grid potential has been shown, the same conclusions are equally true for all values of alternating grid potential, the only effect of variation of alternating potential being the change of the associated direct current grid potential to produce control at the same position, which in turn determines the amount of variation of direct current voltage necessary for any desired range of control.

Figure 11:
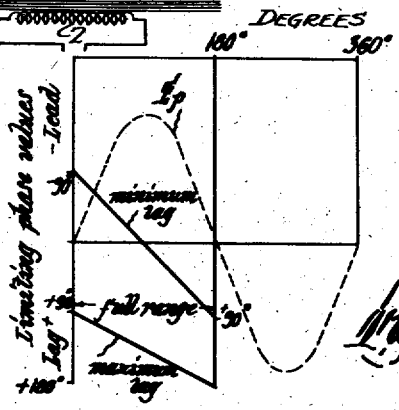
Figure 11 is a diagram developed from the diagrams of Figures 8, 9 and 10.

Figure 11 is a summary of the effects illustrated in Figures 8, 9 and 10. Here again the plate to filament sine wave voltage $E_p$ has been shown by way of reference. Plotted against the degrees of a complete cycle of this voltage are the limiting values of phase of grid alternating potential for control at corresponding points in the cycle. The most important effect shown by this summary is that full range smooth control is possible only with the grid potential lagging at just 90°. If the angle is less than 90°, then as the direct controlling current in the grid circuit becomes gradually more negative, the time of flow of plate current, instead of diminishing gradually to zero will diminish gradually to a certain point, and then shut off to zero suddenly. If, on the other hand, the angle of lag is greater than 90°, then as the controlling direct current potential in the grid circuit becomes gradually more positive, the time of flow of plate current, instead of gradually increasing to a maximum condition, will increase gradually to a certain point only, from which any further increase of positive direct current potential will cause the plate current to flow during the entire positive half of the cycle and thus be at a maximum. In simple language, therefore, if the angle is too small, the tube will close suddenly or with a "bump", and if too large, the tube will "bump" wide open.

It will now be apparent that full range direct current control is possible only with a fixed alternating current phase, but sometimes for specific purposes a shift of phase may be utilized to limit the control range of the controlling direct current. For example, it may be desired to operate a motor as in the diagram of Figure 7 so that it will have a current flow just sufficient to overcome the starting friction of the motor. Where this is desired the phase of the grid current potential is set lagging sufficiently less than 90° so that current will pass to the desired extent. Current passing more than this minimum then may be made to vary with the direct controlling potential through the working range of the motor. With this arrangement the control of current flow of a value less than necessary to keep the motor revolving is eliminated. Likewise it is possible by setting the phase angle of grid potential at more than 90° lag to set up a control range within low speed limits which passes at a single jump without intermediate range to a high speed. In both cases, however, the phase relation is fixed. Of course, there may be a supplemental phase shift control dependent on the direct current control. For example, if the phase were caused to continually decrease in lag as the direct current is increased and the time of plate current flow increases, a limited variation of this phase angle as a supplement to the direct current potential throughout the entire range could be used. A supplemental phase shift control which always increases the angle of lag when the direct current potential is well on the negative side and is decreasing and always decreases the angle of lag when the direct current potential is on the positive side might be employed as supplemental to the direct current control.

The effects of relative changes in magnitude of the alternating and direct components of the grid voltages will be apparent from an inspection of the curves of Figures 8 to 11. The magnitude of alternating component must be considerable in comparison with the amplitude of the critical grid voltage curve $E_c$ so that harmonics set up in either the grid or plate circuit by the flow of current through the rectifier shall have a negligible effect on the operation of the circuit. In practice, therefore, there is a rather definite minimum of value of alternating current voltage which will provide smooth operation. With positive direct current potential, increase of magnitude of alternating current potential tends to decrease the time of flow of the plate current, and with negative direct current potential increase of alternating potential magnitude tends to increase time of plate current flow. Thus increase of alternating current voltage tends to reduce the controlling effect of changes in the direct current voltage. Increase of direct current potential overcomes this so that properly employed variation of alternating current voltage magnitude may be used as a supplemental control for direct current potential so long as the phase is undisturbed and the magnitude of the alternating potential always is maintained greater than a predetermined minimum.

Referring now to the discontinuous control by the use of correct alternating current phase, it is possible to have the rectifier open from the shut off position to a condition where it passes just sufficient current to cause rotation of a motor and then from this point to open gradually to full opening so that the speed of the motor varies with the direct current control of the circuit, there being a constant direct current grid voltage bias just insufficient to start the motor.

This characteristic of sudden discontinuance of smooth control may be useful in other relations. For example, it may be desired to have a rapid rate of motion of a motor to feed work or a tool into close juxtaposition whereupon the feed may be suddenly slowed to the rate desired for the machining operation. The rectifier is thus wide open when there is no controlling direct current on it, but as soon as this controlling direct current is applied there is immediately a large decrease of current flow to the motor to a predetermined value less than full current flow and through this lower range of speed the motion is controlled smoothly to the full off position.

Figure 12:
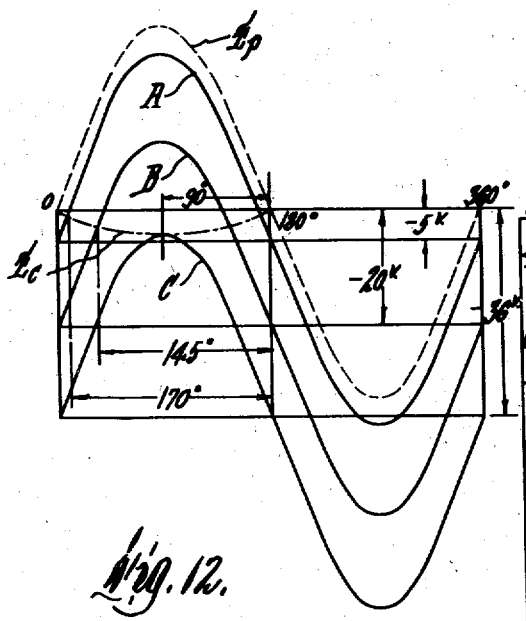
Figures 12, 13, 14 and 15 are further diagrams showing the effects of varying phase relation between alternating grid voltage and the input power.

Any point of instantaneous turning on or turning off of the rectifier may be combined with any rate of control from the turn-off point to full opening, or from the off position to the turn-on point. (By "turn on" point is meant the point at which the rectifier passes from gradual control to instantaneous full opening, while the "turn-off" point means where the rectifier closes instantaneously from some partially open condition.) The operation of this discontinuity and its control may be more readily understood by reference to Figures 12 to 15. Figure 12 illustrates the condition where the grid potential curves A, B and C lag the plate potential curve $E_p$ by zero degrees, that is, are exactly in phase. The curve $E_c$ represents the critical value of grid voltage curve as in Figures 8 to 10. If the potential of the grid with respect to the cathode at any time during the positive half of the plate potential cycle is more positive than the value indicated by the curve $E_c$, the rectifier will open and remain open until the plate current falls to zero and the grid potential becomes less than this critical value.

Curve A of Figure 12 shows the grid potential at its most positive position. The axis of this curve is minus 5 volts with respect to the zero line, that is, there is a negative direct current potential component of five volts on the grid circuit. This curve A intersects $E_c$ at very nearly five degrees so that the rectifier opens almost as soon as the plate potential becomes positive and remains open during the remainder of the half cycle. The curve B is similar to curve A, except that the direct current grid component is minus 20 volts, fifteen volts more negative than in curve A. The intersection of the curve A with the curve $E_c$ occurs at a later point in the cycle as a result of this more negative bias and the rectifier is open for approximately 145° instead of about 170° as in curve A. Curve C has the negative direct current component increased to a value of thirty-six volts. This curve C is substantially tangent to the curve $E_c$ at a point of 90° in the cycle so that the rectifier is open about 90°. The operation of the rectifier under the conditions shown in Figure 12 under the direct current control from minus 5 volts to minus thirty-six volts is smooth and continuous. As the potential becomes more negative the time of tube-opening decreases until at the minus thirty-six volt condition the rectifier is open ninety degrees during every cycle. If the direct current grid voltage is further decreased, the grid potential curve will fail to reach the critical curve $E_c$ and the rectifier will not open at all. Thus, the rectifier under the conditions shown will operate smoothly on direct current control from one hundred eighty degrees to ninety degrees and will then close off entirely in a single step from ninety degrees to full off.

Figure 13:
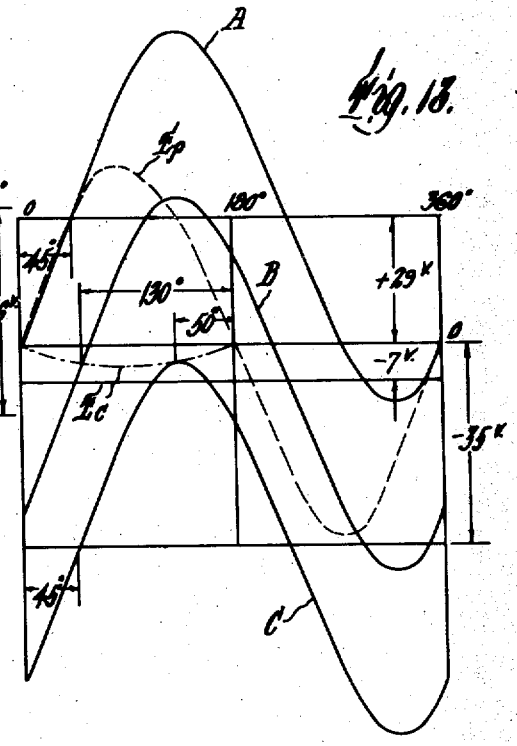
Figure 14:
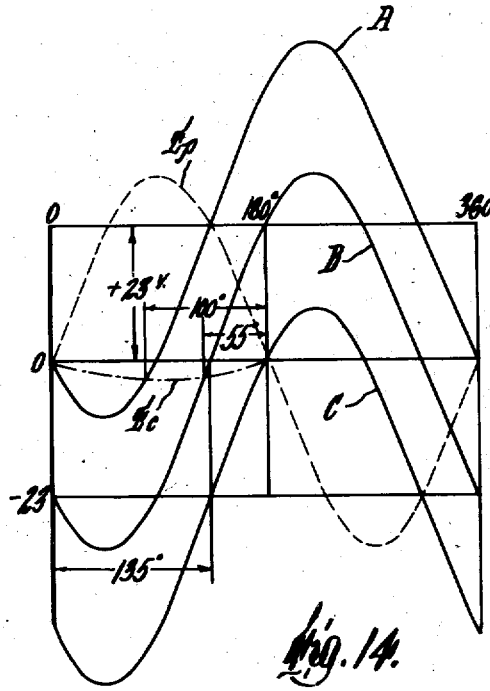

Figure 13 illustrates a similar situation, except that in this case the alternating potential of the grid lags the plate potential by forty-five degrees instead of zero. With this alternating potential it is necessary for the direct current potential to be positive twenty-nine volts to cause full opening of the rectifier as indicated in the curve A of Figure 13. Curve B of minus 7 volts direct potential again illustrates an intermediate position with the rectifier open about 130°. Curve C, minus 35 volts is just tangent to the curve $E_c$ and allows the tube to open for fifty degrees during each cycle. If decreased below this the rectifier becomes entirely closed. Thus by increasing the phase lag of the grid potential from zero to 45°, as shown in Figures 12 and 13, the control range has been extended from that between 180° to 90° in Figure 12 to that between 180° and 50° in Figure 13. If the phase lag were increased to 90°, the control range would extend from 180° to 0°, which is the condition for full range control. If, on the other hand, the phase of the grid lags more than 90°, conditions similar to those shown in Figures 14 and 15 would exist. Figure 14 shows the phase of the grid lagging by 135°. Here with a direct current potential component of minus 23 volts, as indicated on curve C, this curve intersects the critical voltage curve $E_c$ at nearly 180°, so that it is nearly completely closed. Curve B shows that with the direct current grid potential at zero, with the same magnitude of and lag in the alternating current grid component as in curve C, the critical voltage curve $E_c$ is intersected at 120° so that the rectifier is open during 55° of the positive plate cycle. The control from the position of curve C to the position of curve B is continuous and smooth and so remains until the position indicated by the curve A is reached with a direct potential component of plus 23 volts and with the rectifier open through 100° of the cycle. In other words, from minus 23 volts to plus 23 volts direct current grid potential, the rectifier gradually opens from the off position to 100° opening. A further increase of the positive direct potential component, however, causes the grid potential curve to intersect the critical curve $E_c$ at zero degrees so that the rectifier will be opening during the entire positive half of the plate cycle. Thus the tube will open from 100° to 180° in a single step and will remain wide open as long as the grid potential has a direct current component of more than plus 23 volts.

Figure 15:
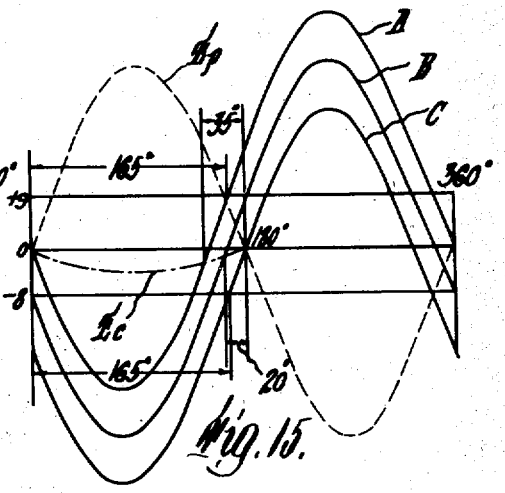

Figure 15 illustrates the same effects as Figure 14, except that the alternating current component of the grid potential lags the plate current supply by 165° instead of 135°. Curve C in these figures, with a direct current potential component of minus 8 volts holds the rectifier at the point of just turning on. In curve B with a zero direct current component of grid potential the rectifier is open for 20°, while in curve A having a direct current potential component of plus 9 volts the rectifier is open for 35°. Any further increase in the positive potential will cause this grid voltage curve to intersect the critical grid voltage curve $F_c$ at the zero point, causing full opening of the rectifier during the entire positive half of the plate voltage cycle. Thus with the condition shown in Figure 15 the rectifier will open gradually from the full off condition to 35° open and then will bump wide open with any further increase of positive direct current potential.

The point at which the rectifier passes from smooth to sudden opening may be varied from the zero-degree-position where the control is smooth during full 180° of positive plate potential to a 180° plus position where smooth control is entirely eliminated. The former point of smooth full range control is, as has been heretofore pointed out, just 90° lag, while the latter, where smooth control has entirely vanished, is at 180° lag.

It is thus apparent from these curves that a combination of smooth and sudden change of plate current flow can be obtained from a continuous direct current potential variation by employing an alternating current component of suitable magnitude and phase. The point of change from smooth to sudden control is almost entirely a matter of phase relation, while the ratio of change of direct current grid voltage to change of output which occurs during the smooth portion of the control range may be varied within wide limits by proper choice of magnitude of the alternating grid component.

Figure 19:
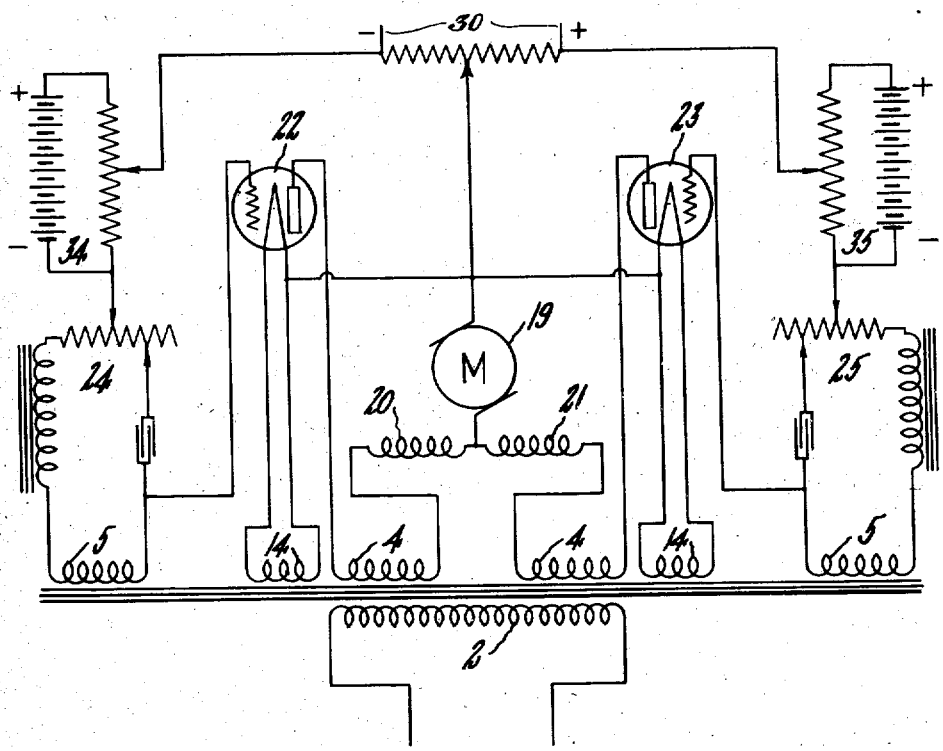
Figure 19 is a diagram showing an arrangement for smooth control of a motor from rotation at full speed in one direction through stop, reverse and full speed in the opposite direction.

In Figure 19 is illustrated a motor control for reverse rotation of a motor. This circuit shows reverse field windings 20 and 21 for the motor armature 19, passage of current through each reverse field winding being controlled by its own rectifier tube 22 or 23 similar to the diagram of Figure 7. At 24 and 25 are the sources of out of phase alternating grid voltage component, and the variable controlling direct current grid component is connected in at 30 so arranged that as it varies it makes the grid of one rectifier more positive by the same amount that it makes the grid of the other more negative. Means by which two direct current voltages may be caused to vary equally and oppositely in response to variations of a controlling variable are old and well known and per se form no part of the present invention. An example of such means is shown in the patent to Wold, No. 1,232,879, patented July 10, 1917. By using a phase lag from the units 24 and 25 sufficiently less than 90° so that the rectifiers pass just enough current to turn the motor as soon as they pass any current at all, and with proper biasing direct current as from the units 34 and 35 and magnitude of the alterating grid potential, the motor may be controlled smoothly from full speed rotation in one direction through stop to full speed rotation in the other direction by movement of the slider 31 without any range of motion during which the motor is stationary.

Figure 16:
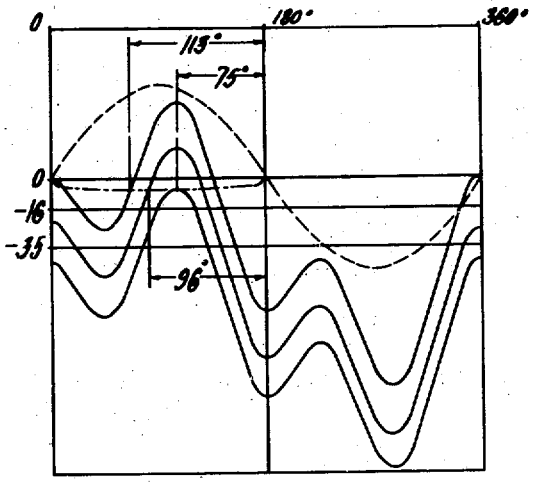
Figures 16, 17 and 18 are further diagrams illustrating the effects of the introduction of harmonic frequencies in the alternating component of grid potential.
Figure 17:
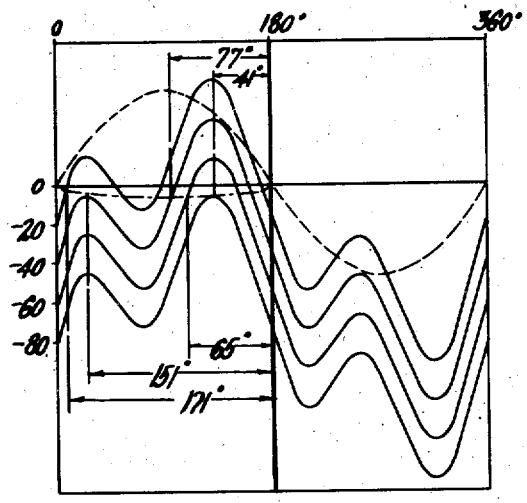
Figure 18:
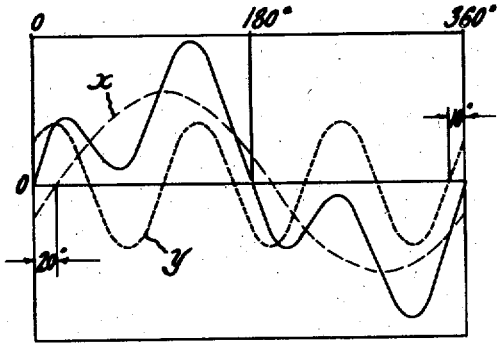

Figures 16, 17 and 18 illustrate the fact that the introduction of harmonic frequencies in the alternating current component of grid potential will produce effects comparable with those resulting from shift of phase of the fundamental component. By a careful choice of harmonics it is possible to obtain two points of break in the output curve, combining the effects shown in Figures 12 and 13 with those of Figures 14 and 15. Thus the rectifier can be made to turn on to a predetermined value at a single step, then open smoothly to another predetermined point, and then open at once wide. Referring to these figures, it will be noted that the grid control potential wave is no longer a sine wave, but a complex wave containing harmonics. The curve 16 shows the rectifier opening initially to a predetermined value, then opening smooth for a further range as the direct control current becomes positive, and then in a single step opening wide. Figure 16 shows these points in the lowest and highest grid voltage curves, respectively, at about 70° and 113°. Figure 17 shows the rectifier opening at a single step from closed to a predetermined opening of 41 degrees, as the direct current component of grid potential becomes more positive than minus 80 volts, then passing gradually from 41 degrees open to 77 degrees open as the direct current component of grid potential passes from minus 80 volts to minus 40 volts; when the direct current component of grid potential becomes more positive than minus 40 volts, the tube opens at a single step from 77 degrees open to 151 degrees open, and then opens gradually from 151 degrees to 180 degrees or full open as the direct current component goes from minus 40 volts to zero volts.

Figure 18 shows the derivation of the complex alternating potential grid wave of Figures 16 and 17 from the wave of the same frequency as applied to the plate (dash line $x$) and another wave (dotted line $y$) of two-thirds the magnitude and three times the fundamental frequency of the line $x$. This third harmonic component may be derived from the saturation current of an iron cored reactance coil run at high density. If accuracy in this harmonic is desirable it may be obtained by the use of a band pass filter in a manner well known in the art. It is possible to find a combination of fundamental and harmonic grid potential which will cause almost any desired curve of control to exist. It is possible to derive many complex wave forms by a proper combination of saturated reactors, condensers, and resistors, especially if the reactances of the condensers employed are somewhere near the average impedances of the saturated inductances.

Figure 20:
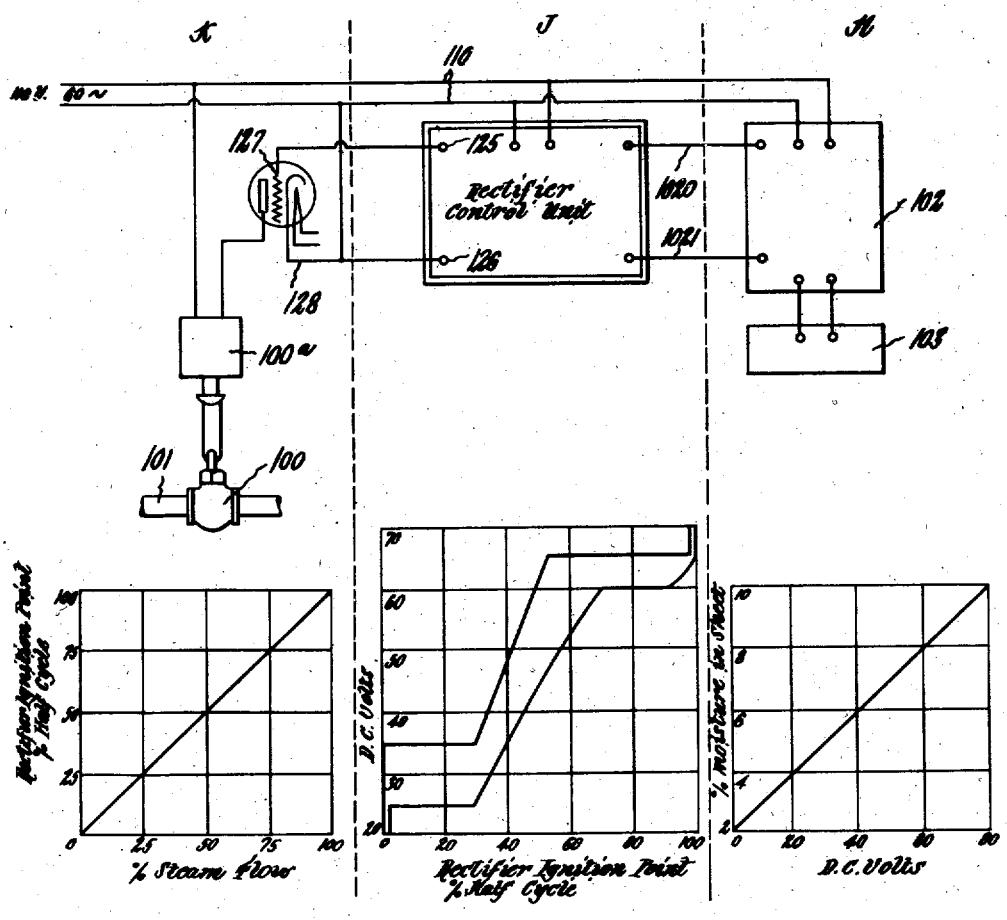
Figure 20 is a diagrammatic view of a system of rectifier control in which use is made of harmonic frequencies.

In Figures 20 to 28 is illustrated a practical application of the use of harmonics together with diagrams showing the effects produced. In Figure 20 is shown in outline certain units for this purpose in panels H, J and K, and showing characteristic diagrams of the actions within these units in the lower portion of this figure. The mechanism 100a in panel K controls a steam valve 100 in a main 101 which may lead to the drier cylinders (not shown) of a papermaking machine, the valve being controlled from mechanism shown enclosed in the panel H and indicated at 102 and 103. The mechanism 103 may be a hygrometric element responsive to the moisture content of the paper after it leaves the drier, as, for example, as shown in the Allen Patent No. 1,781,153, November 11, 1930, and the mechanism 102 is a source of direct current voltage rectified from the alternating current mains 110 and responsive in direct current voltage to the condition of the mechanism 103, its direct current terminals being connected to the leads 1020 and 1021. In the Allen patent hereinbefore mentioned this direct current voltage actuates the moisture indicating instrument.

In the control of the steam valve 100 it is commonly desirable to have the variation of the steam flow proportional to the variation of moisture to which the mechanism 103 responds within a limited range. If the moisture goes outside this range it then becomes desirable to set the steam valve to its extreme position in order that the minimum of paper shall be produced, the moisture content of which lies outside of this range. In other words, when the sheet is very dry the steam should be shut off entirely. When the sheet becomes 1½% drier than that desired, the steam valve should be adjusted to admit an amount of steam slightly less than that presumably necessary to dry the sheet to the desired point. As the sheet continues to become moister the steam flow should be gradually increased in proportion to an increase in moisture up to a point where the sheet is approximately 1½% wetter than the desired value at which point the steam should be turned on full and there left as long as there is any moisture greater than this amount in the paper. It is apparent that it is necessary to interpose some mechanism between the measuring apparatus in panel H, including the mechanisms 102 and 103, and the steam control apparatus in the panel K, in order to obtain this result. This apparatus is indicated as the rectifier control unit and is shown in panel J. Two available characteristics of this unit are shown in the lower part of this panel in the diagram.

Figure 21:
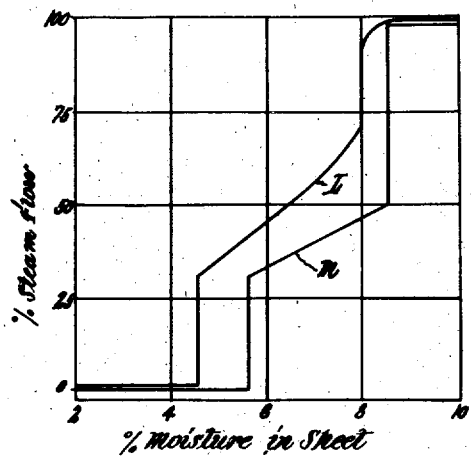
Figure 21 is a diagram showing characteristic relations between the controlling and controlled mechanisms.

Assuming the characteristics of this unit as shown, together with the characteristics of measuring and control apparatus, the resultant characteristic of steam flow plotted against moisture is shown in Figure 21. Two characteristics are there shown marked L and M. Examining curve M it will be noted that for moisture of 5½% or less the steam flow is zero and that for moistures of 8½% or more the steam flow is 100%, or in other words, the steam valve 100 is wide open. For moistures between 5½% and 8½% the steam flow varies from 30% to 50%, this variation being proportional to the variation of moisture in the sheet as affecting the mechanism 103.

Figure 22:
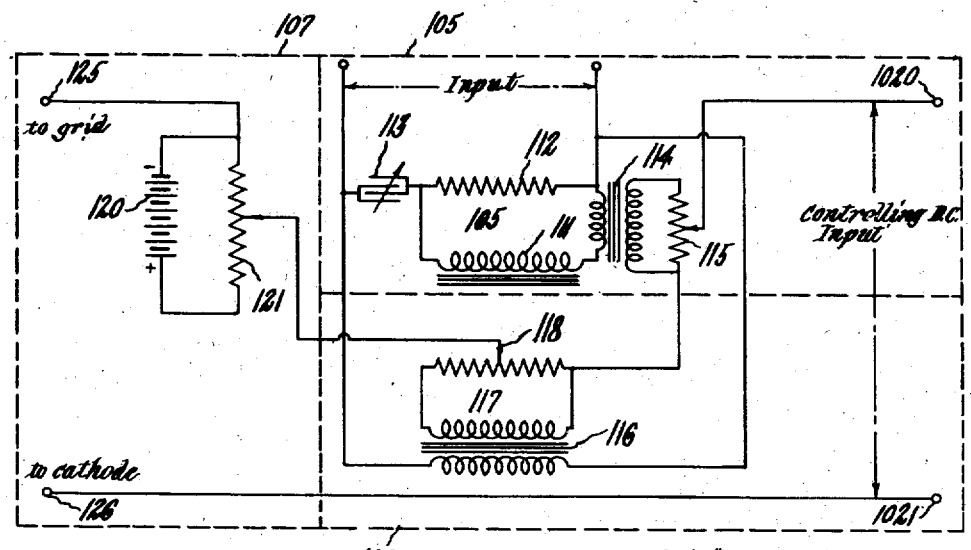
Figure 22 is a wiring diagram of one of the units shown in Figure 20.

Figure 22 shows the circuit of the rectifier control unit indicated in the central panel J of Figure 20 whose characteristic is shown in the diagram in the lower portion of this panel. Referring to Figure 22, this unit consists of three main elements. There is a source of harmonics 105, a source of fundamental frequency cyclic or alternating potential 106, and a source of direct current potential 107, all of which are independently variable and which are shown in Figure 22 set off from each other by dotted outlines. The harmonics arise from an iron cored inductance 111 of three henries value. This is supplied from the input lines through a resistance condenser combination 112, 113 which shifts the phase of the potential applied to this inductance by 45°. Since the impedance of the resistance 112 and the condenser 113 is approximately 10% of the impedance of the inductance 111, the current through the inductance 111 is about 10% of the total in this circuit so that the current in the inductance 111 and its wave form have substantially no effect on the total. In series with the inductance 111 and between it and one end of the resistance 112 is a current transformer 114 of 1 to 10 ratio across which is connected a 750 ohm resistance 115. This is equivalent to connecting a 7.5 ohm resistance between the inductance 111 and the resistance 112. Since the impedance of the inductance 111 is approximately 1000 ohms, the 7.5 ohm series resistance has a negligible effect. However, the potential across the 750 ohm resistance 115 will vary exactly as the current through the inductance 111. It is a well known fact that the magnetizing current in an inductance across which is impressed a sine wave electro-motive force contains a considerable portion of harmonics.

Figure 23:
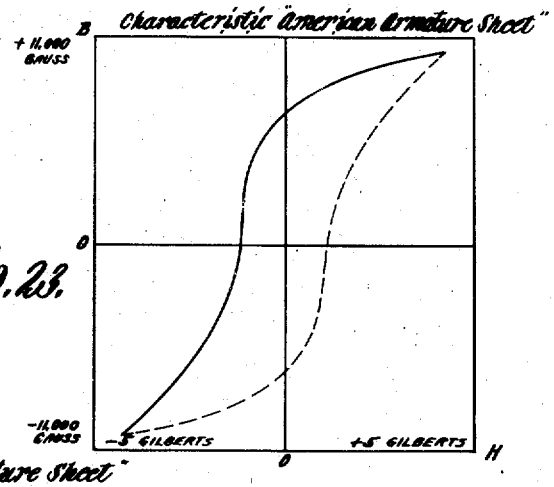
Figure 23 is a diagram of a typical B—H curve for a standard grade of laminated iron.
Figure 24:
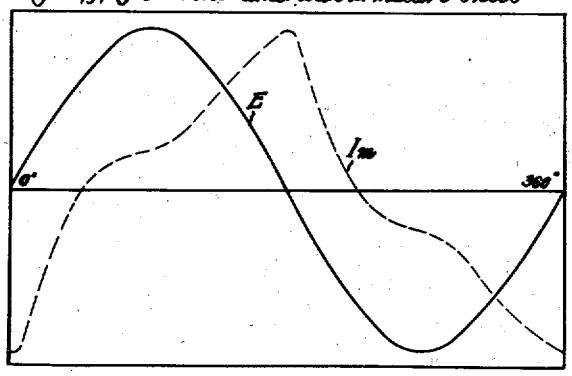
Figure 24 is a diagram showing the magnetizing current flowing through an inductance having the core of the iron of Figure 23 and on which inductance is impressed a sine wave electromotive force.

In Figure 23 is indicated a typical B—H curve for a standard grade of laminated iron and in Figure 24 is indicated the magnetizing current $I_m$ which would flow through an inductance having a core of this iron on which there is impressed a sine wave electro-motive force E. It will be noted that the current $I_m$ lags the voltage E by approximately 45° and that this current contains a considerable proportion of harmonic values.

Assuming this current $I_m$ flows through the three henries inductance 111, the voltage across the resistance 115 will vary exactly with the variation of the current $I_m$ of Figure 24. In the circuit the potential E applied across this choke 111 is the same as that across the 100 ohm resistor 112. Since the resistor 112 is connected across the line in series with a capacity 113 of 25 microfarads having an impedance of approximately 100 ohms, the voltage in the resistance 112 will lead the voltage impressed from the line 110 by 45°. In other words, the voltage E shown in Figure 24 leads the impressed voltage from the line by 45°. Since the current $I_m$ lags the voltage E shown by 45°, this current $I_m$ then is in phase with the applied voltage from the line and the voltage across the 750 ohm resistor 115 resulting from the current flow $I_m$ through the 1 to 10 current transformer 114 will likewise be in phase with the impressed potential. This voltage is shown as $E_0$ of Figures 25 and 26. This voltage $E_0$ is the sum of a certain amount of fundamental plus various harmonics.

The second element 106 of the control unit consists of a transformer 116 and resistor 117 which produces a sine wave of alternating potential in phase with and exactly proportional to the input potential from the line 110. This alternating potential is added to the fundamental plus harmonic potential derived from the harmonic source 105. This potential is variable by varying the tap 118 on the 1000 ohm potentiometer 117. Two values of this potential are shown added to the harmonic potentials in Figures 25 and 26. These potentials are designated as $E_3$ and $E_4$ and are subtracted from the $E_0$ of these figures giving potentials $E_1$ and $E_2$.

The third section 107 of the control unit in panel J consists of a source of variable direct current potential shown as a battery 120 and a potentiometer 121, all three sections being connected in series and in series with the controlling direct current through leads 1020 and 1021 from the external source and applied as at 125 and 126 between the rectifier grid 127 and the cathode 128 (Figure 20) which rectifier controls the position of the valve actuator 100*a* shown as a solenoid for opening the gravity-closed valve 100.

Figure 27 indicates the effect of the alternating potential supplied from the harmonic and fundamental source upon the rectifier. As has been previously noted, these characteristics are in phase with the potential applied from the mains 110 which is likewise applied to the plate to cathode circuit of the rectifier. As will be apparent upon inspection, as the zero line of the alternating potentials varies up and down due to the direct current of the control unit plus the controlling direct current curves $E_1$ or $E_2$ (Figs. 26 and 27) move up and down, intersecting curve $E_c$ which represents the critical value of rectifier cut-off. Curve $E_2$ in the position as shown lies entirely below the curve $E_c$ and hence the tube remains closed. As the zero line and with it $E_2$ move up due to more positive direct current potential the peak of $E_2$ intersects the curve $E_c$ at about 25% full tube opening. In other words, the tube is either all off or at least 25% open. As the zero line continues to rise, the curve $E_2$ intersects the curve $E_c$ at a constantly earlier point until the tube is about 50% open at which point the rising portion of curve $E_2$ at 100% full opening intersects the curve $E_c$ at 0° of the cycle causing the tube to open full. In other words, the tube opens gradually from 30% to 50% and then in a single motion from 50% to 100%. This is shown diagrammatically in Figure 28, in the curve $r_2$. Similarly the action of the characteristic $E_1$ is shown in curve $r_1$ in this figure. As will be noted, Figure 28 is the same as the lower diagram of panel J of Figure 20, except that the scale of direct current volts has been altered. It is apparent that by varying the direct current potential of the rectifier control unit, the whole curve, Figure 28, may be moved up or down at will. Figure 28 represents the action of the alternating current components supplied by the rectifier control unit. The diagram in panel J, Figure 21, indicates the control as a whole with alternating plus direct potential components.

It is apparent that by varying the fundamental components of the alternating current control any curve value between that shown at L and M of Figure 21 within the limits shown can be produced and that by varying this value outside the limits shown other curves will result. Furthermore, by increasing or decreasing the magnitude by both fundamental and harmonic components the ratio of moisture to steam flow within the smooth variation section can be varied at will. By varying the direct current potential of the rectifier control unit, the entire characteristic of Figure 21 may be moved to the right or left, the action occurring within any desired limits of moisture. Furthermore, by varying the capacity of the condenser 113 of the harmonic source of Figure 22, the harmonic characteristic may be displaced to the right or left thereby varying the minimum amount of steam flow up or down as may be desired. These variations indicate roughly a few of the possibilities. By suitable combinations of resistors, iron inductances, and capacity almost any desired wave form or wave forms can be produced resulting in almost any desired response characteristic of the rectifier control unit and thereby resulting in any desired relationship between the controlling direct current potential and the response of the rectifier and giving any desired relation between sheet moisture and steam flow.

From the foregoing description of the method of operation and fundamental circuits showing its application, it should be evident to those skilled in the art that various other changes and modifications might be made without departing from the spirit or scope of this invention as defined by the appended claims.

I claim:

1. The method of operatively controlling electrical power passed by an ionic valve having a plurality of electrodes and voltage-responsive means for controlling the time of commencement of current flow through said valve, which comprises impressing a cyclic voltage differential between said electrodes periodically reaching a value to stop the power flow once started, impressing on said control means a cyclic voltage of the same fundamental frequency as said cyclic voltage differential, selecting the phase relationship between said cyclic voltage and said cyclic voltage differential to determine the extent and position of discontinuity of smooth control, and varying the position of the axis of said cyclic voltage to control the passage of said electric power.

2. The method of operatively controlling electrical power passed by an ionic valve having a plurality of electrodes and voltage-responsive means for controlling the time of commencement of current flow through said valve, which comprises impressing a cyclic voltage differential between said electrodes periodically reaching a value to stop the power flow once started, impressing on said control means a cyclic voltage of the same fundamental frequency as said voltage differential, selecting the phase relationship between said cyclic voltage and said cyclic voltage differential to determine the extent and position of discontinuity of smooth control desired, impressing on said cyclic voltage a voltage having a direct current component, and varying said component to control the passage of said electrical power.

3. The method of controlling a condition influenced by the electrical power passed by an ionic valve having a plurality of electrodes and voltage-responsive means for controlling the time of commencement of current flow through the valve, which comprises impressing a cyclic voltage differential between said electrodes periodically reaching a value to stop the power flow once started, impressing on said control means a cyclic voltage having a predetermined program of variation chosen in accordance with the particular needs of the condition to be controlled, and varying the position of the axis of said cyclic voltage to control the passage of electrical power.

4. The method of controlling a condition influenced by the electrical power passed by an ionic valve having a plurality of electrodes and voltage-responsive means for controlling the time of commencement of current flow through the valve, which comprises impressing a cyclic voltage differential between said electrodes periodically reaching a value to stop the power flow once started, impressing on said control means a cyclic voltage having a predetermined program of variation chosen in accordance with the particular needs of the condition to be controlled, and varying a continuous direct current component of said cyclic voltage to control the electrical power passed by said valve.

5. The method of controlling a condition influenced by electrical power passed by an ionic valve having a plurality of electrodes and voltage-responsive means for controlling the time of commencement of current flow through said valve, which comprises impressing a cyclic voltage differential between said electrodes periodically reaching a value to stop the power flow once started, impressing on said control means a cyclic control potential made up from a plurality of components of frequency harmonically related to said voltage differential, predetermining the phase and magnitude of said components in accordance with the program of variation desired, and varying the position of the axis of said cyclic voltage to control the passage of electric power.

6. The method of operatively controlling the output of an arc rectifier having a separate potential control of ignition time, and having alternating potential differences impressed thereacross through a load, which comprises impressing alternating potential of the same frequency as said potential differences and a direct current potential on said time control, controlling said direct current potential, and controlling the phase relation of said alternating ignition control potential to said potential differences to determine the extent and position of discontinuity of smooth control by direct current ignition time voltage variations.

7. The method of operatively controlling the output of an arc rectifier having a separate potential control of ignition time, and having alternating potential differences impressed thereacross through a load, which comprises impressing alternating potential of the same frequency as said potential differences and a direct current potential on the time control, controlling said direct current potential, and controlling the relative magnitudes of the alternating current and direct current time control voltage components to determine the ratio of variations in output of said rectifier to variations in controlling direct current time control voltage.

8. The method of operatively controlling the output of an arc rectifier tube having a separate control of ignition time, and having alternating potential differences impressed thereacross through a load, which comprises impressing alternating potential of the same frequency as said potential differences and a direct current potential on the time control, controlling said direct current potential, controlling the relative magnitudes of the alternating current and direct current ignition time control voltage components to determine the ratio of variations in output of said rectifier to variations in controlling direct current time control voltage, and controlling the phase relation of said alternating control potential to said potential differences to determine the extent and position of smooth output control by the direct current time control voltage variation.

9. The method of smoothly controlling the output of an arc rectifier having separate potential control of ignition time throughout its entire range from no current to full current, which comprises impressing on the ignition control of said rectifier alternating potential of the same frequencies as the input power and lagging the same by 90° and a controlling direct current potential for operation for said entire range, and controlling the value of said direct current ignition control potential.

10. The method of operatively controlling electrical power passed by an ionic valve having a plurality of electrodes and voltage responsive means for controlling the time of commencement of current flow through said valve, which comprises impressing a cyclic voltage differential between said electrodes periodically reaching a value to stop the power flow once started, impressing on said control means a cyclic voltage of the same frequency as said cyclic voltage differential, impressing on said cyclic voltage a voltage having a direct current component, selecting a phase relationship between said cyclic voltage and said voltage differential sufficiently different from 90° to produce a discontinuity in the smooth control of said valve by variation of said component at the desired point in the control, and varying said component to control the passage of electric power.

11. The method of controlling the output of an arc rectifier having a separate potential control of ignition time, to provide a predetermined minimum flow greater than zero, which comprises impressing on the ignition control a direct current voltage and an alternating current voltage component of the same frequency as the rectifier input, said alternating current voltage component lagging the input phase by an amount sufficiently less than 90° to produce the desired minimum current flow, and varying said direct current voltage.

12. The method of controlling the output of an arc rectifier having a separate potential control of ignition time to produce a sudden increase of output to full power after a gradually controlled increase from a lower output, which comprises impressing on the ignition control a direct current controlling voltage and an alternating current component of the same frequency as the rectifier input, said alternating current ignition control voltage component lagging the input phase by an amount sufficiently greater than 90° to produce full opening of said rectifier at the desired point, and varying the direct current component of ignition control voltage.

13. The method of controlling the output of an arc rectifier with separate potential control of ignition time for smooth control within a range less than from no current to full current passage, which comprises impressing on the ignition control of said rectifier a controlling direct current potential and an alternating current potential of the same basic frequency as the input power, and having the higher harmonics, selecting such harmonics and the phase relation between the basic wave of said ignition control alternating current voltage component to said input to produce the desired departure from smooth full range control, and varying the amount of said controlling direct current ignition control voltage.

14. The method of controlling a motor fed from an arc rectifier with separate control of ignition time, which comprises impressing on the ignition control of said rectifier a controlling variable direct current potential and an alternating current potential of the same frequency as said rectifier input and sufficiently less than 90° lagging in phase to cause smooth control of rectifier output through said motor by variations of controlling direct current potential to begin with flow of ouput current substantially just sufficient to start said motor.

15. The method of controlling a reversible motor fed from arc rectifiers for opposite directions of motion, each rectifier having separate control of ignition time, which comprises impressing on the ignition controls of said rectifier controlling variable direct current potentials the one increasing while the other correspondingly decreases and alternating current potential of the same frequency as the input to said rectifiers and sufficiently less than 90° lagging in phase to cause smooth control of rectifier output to said motor by variation of said controlling direct current potential to begin with flow of current substantially just sufficient to start said motor, whereby smooth control of said motor from operation in one direction through stop and operation in the reverse direction is produced by continuous variation of said direct current control potentials.

16. The method of controlling a motor fed from an arc rectifier with separate control of ignition time, comprising impressing on the ignition control of said rectifier a controlling variable direct current potential and an alternating current potential of the same frequency as the input to said rectifier and sufficiently more than 90° lagging in phase to cause smooth control of motor speed only throughout a range a predetermined amount less than that caused by a maximum opening of said rectifier to current flow, whereby at the upper limit of said range the motor has suddenly impressed thereon the maximum current flow which said rectifier can pass.

17. The method of controlling the output of an arc rectifier with separate potential control of ignition time for smooth control within a range less than from no current to full current passage, which comprises impressing on the ignition control of said rectifier a variable controlling direct current potential and an alternating potential of the same frequency as the input to said rectifier but containing harmonics and in correct phase relation to said input to cause sudden closing or opening of said rectifier to a predetermined lower partial opening limit to be produced by variation of said direct current potential adjacent to a relatively low point, sudden full opening or closing from a predetermined higher partial open limit by variation of said direct current potential adjacent to a relatively high point and smooth control of the extent of opening of said rectifier between said limits with smooth variation of controlling direct current potential between said relatively low and high points.

18. A power circuit comprising an arc rectifier having a separate potential control of ignition time, a load in the rectifier output, means for impressing alternating potential across said rectifier, means for impressing a controlling variable direct current potential on said ignition control, and means for impressing an alternating current potential on said ignition control of the same fundamental frequency as the input to said rectifier but with higher harmonics and so related to the phase of said input potential as to cause smooth variations in controlling direct current ignition control voltage throughout a control range having its lower limit at a predetermined minimum output current flow greater than zero and its upper limit at a predetermined maximum less than that of full rectifier opening.

19. A power circuit comprising an arc rectifier having a separate potential control of ignition time, a load in the output circuit comprising a motor, means for impressing alternating potential across said rectifier, means for impressing controlling variable direct current potential on said ignition control, and means for impressing an alternating current potential on said ignition control of the same fundamental frequency as said rectifier input potential but with higher harmonics so related to the phase of said input potential as to cause smooth variations in controlling direct current ignition control voltage throughout a control range having its lower limit at a predetermined minimum output current flow greater than zero and substantially just sufficient to start rotation of said motor and its upper limit at a predetermined maximum less than that of full rectifier opening and where said motor is rotating at a speed less than maximum corresponding to full rectifier opening.

WILFRED H. HOWE.